United States Patent
Wang et al.

(10) Patent No.: US 11,059,748 B2
(45) Date of Patent: Jul. 13, 2021

(54) INTEGRATED LIME HYDRATOR

(71) Applicant: GENERAL ELECTRIC TECHNOLOGY GMBH, Baden (CH)

(72) Inventors: Wuyin Wang, Vaxjo (SE); Per Hakan Fredrik Landmer, Vaxjo (SE); Evald Johansson, Vaxjo (SE); Lars-Erik Johansson, Vaxjo (SE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 47 days.

(21) Appl. No.: 16/316,365

(22) PCT Filed: Jul. 4, 2017

(86) PCT No.: PCT/EP2017/066678
§ 371 (c)(1),
(2) Date: Jan. 9, 2019

(87) PCT Pub. No.: WO2018/011024
PCT Pub. Date: Jan. 18, 2018

(65) Prior Publication Data
US 2019/0292100 A1    Sep. 26, 2019

(30) Foreign Application Priority Data
Jul. 11, 2016  (EP) ..................................... 16178909

(51) Int. Cl.
*C04B 2/08* (2006.01)
*B01D 53/50* (2006.01)
(Continued)

(52) U.S. Cl.
CPC .............. *C04B 2/08* (2013.01); *B01D 53/504* (2013.01); *B01D 53/80* (2013.01);
(Continued)

(58) Field of Classification Search
None
See application file for complete search history.

(56) References Cited

U.S. PATENT DOCUMENTS

| | | |
|---|---|---|
| 1,580,710 A | 4/1926 | Chubbuck |
| 1,872,202 A * | 8/1932 | Williams .............. C01B 32/942 |
| | | 423/442 |

(Continued)

FOREIGN PATENT DOCUMENTS

| | | | |
|---|---|---|---|
| DE | 3607819 | * | 3/1986 |
| IN | 201501239 | * | 11/2017 |

(Continued)

OTHER PUBLICATIONS

Schaschke, Carl et al. "Dictionary of Chemical Engineering". Knovel. (Year: 2002).*

(Continued)

*Primary Examiner* — Sheng H Davis
(74) *Attorney, Agent, or Firm* — Grogan, Tuccillo & Vanderleeden, LLP (57) ABSTRACT

A lime hydrator integrated into a flue gas desulfurization system or other industrial system is provided that provides an in-situ variable rate of cured hydrated lime production for a variable supply rate of the in-situ produced cured hydrated lime for use within a flue gas stream as a moistened hydrated lime for a reduction of acid gas present in a flue gas stream. Also provided is a method of using a lime hydrator integrated into a flue gas desulfurization system or other industrial system to provide in-situ a variable production rate of cured hydrated lime for a variable supply rate of the in-situ produced cured hydrated lime for use within a flue gas stream as a moistened hydrated lime for a reduction of acid gas present in a flue gas stream.

6 Claims, 6 Drawing Sheets

(51) Int. Cl.
*B01F 15/00* (2006.01)
*B01D 53/80* (2006.01)
*C04B 2/04* (2006.01)

(52) U.S. Cl.
CPC .......... *B01F 15/0035* (2013.01); *C04B 2/045* (2013.01); *B01D 2251/404* (2013.01); *B01D 2251/604* (2013.01); *B01D 2257/302* (2013.01)

(56) References Cited

U.S. PATENT DOCUMENTS

| | | | | |
|---|---|---|---|---|
| 2,833,626 | A | * | 5/1958 | Knibbs et al. ............ C04B 2/04 423/155 |
| 3,120,444 | A | | 2/1964 | Dunton et al. |
| 3,134,579 | A | * | 5/1964 | Booth, Sr. ................. C22B 1/14 366/4 |
| 3,573,002 | A | | 3/1971 | Zimmerman et al. |
| 4,370,470 | A | * | 1/1983 | Vidaurri ............... B01J 19/1862 528/388 |
| 4,588,559 | A | * | 5/1986 | Emmett .................... C04B 2/04 209/172.5 |
| 4,917,869 | A | * | 4/1990 | Graf ..................... B01D 53/508 422/162 |
| 9,650,293 | B2 | * | 5/2017 | Christy .................... C04B 2/04 |
| 2007/0104630 | A1 | * | 5/2007 | Huege ...................... C04B 2/10 423/155 |
| 2012/0328510 | A1 | * | 12/2012 | Christy ................... C02F 1/529 423/640 |
| 2014/0044621 | A1 | * | 2/2014 | Vehmaan-Kreula ...... F27B 7/20 423/175 |
| 2016/0279567 | A1 | * | 9/2016 | Dumont ................ B01J 20/045 |
| 2017/0106345 | A1 | * | 4/2017 | Fal ....................... B01J 19/0066 |

FOREIGN PATENT DOCUMENTS

| | | | |
|---|---|---|---|
| WO | 9616727 | * | 6/1996 |
| WO | 199616727 A1 | | 6/1996 |

OTHER PUBLICATIONS

Sanbandham, et al. "A system and method for treating Pre-hydrated calcined lime during sintering". Machine Translation of IN 201501239 (Year: 2017).*
International Search Report and Written issued in connection with corresponding PCT application No. PCT/EP2017/066678 dated Sep. 18, 2017.

* cited by examiner

INTEGRATED LIME HYDRATOR

TECHNICAL FIELD

This disclosure relates to a lime hydrator integrated into a plant flue gas desulfurization system and use of the integrated lime hydrator in the plant flue gas desulfurization system to provide an in situ source of cured hydrated lime for flue gas acid gas reduction. More specifically, the subject disclosure relates to an integrated lime hydrator and use thereof for an in situ variable production rate of cured hydrated lime for an in situ variable supply rate of the cured hydrated lime to a plant flue gas desulfurization system for flue gas acid gas reduction.

BACKGROUND

"Lime" is a general term used to describe calcium-containing inorganic materials, in which carbonates, oxides and hydroxides predominate. Lime is used in large quantities as building and engineering materials including limestone products, concrete and mortar, chemical feedstocks, and other uses. Lime is typically produced from mined limestone or chalk, which are composed primarily of calcium carbonate. These mined limestone rocks may be crushed or pulverized and chemically altered through various processes. For example, "burning" or calcination converts lime into the highly caustic material "quicklime" (calcium oxide, CaO).

Slaked lime or hydrated lime (calcium hydroxide, $Ca(OH)_2$) is produced when quicklime is reacted with water, as described in WO9959704 (U.S. Pat. No. 6,508,994) incorporated herein in its entirety by reference. This hydration reaction is exothermic with approximately 500 Btu/lb of quicklime reacted. In the reaction, the volume of the quicklime particles increases by as much as 94 percent. The mechanism of the hydration process may be described as hydration starting at the most available active sites of the quicklime crystal, causing a volume increase and thereby a stress on the crystal structure. These crystal structural stresses cause the quicklime particles to break open further, which allows water to react with additional newly available active sites thereby continuing the hydration process. Such reaction activity continues until all the active sites of the quicklime are hydrated. As the unreacted active sites on the quicklime crystals decrease, the hydration activity continues to slow down until finally heat production stops.

Often times, the terms "hydrated lime" and "slaked lime" are used interchangeably. However, there is a definite and distinct difference between the two terms. Hydrated lime is produced by a process whereby approximately stoichiometric amounts of water and quicklime react to form a hydrate product which is a dry powder. This dry powder contains less than 1 percent free moisture and is handled as a powder. In contrast, slaked lime is produced by a process whereby quicklime is reacted with an excess of amount of water to form a lime slurry. This lime slurry is handled as a liquid.

Hydrated lime and slaked lime have both been found useful in various types of flue gas desulfurization systems and other industrial uses. However, many challenges still exist in the production of quality hydrated lime for such use. Some such technical challenges involve the lime hydrator. Lime hydrator technical challenges often times involve complications associated with control of the distribution of lime and the distribution of water within the hydrator, complications associated with significant variation in hydrator capacity demand, complications associated with significant variation in produced hydrated lime quality, complications associated with hydrator capacity scale up, and complications associated with hydrator access for maintenance. Advancements to address one or more such hydrator issues are needed. Also, hydrator advancements to address one or more such hydrator issues would be useful and beneficial to industries requiring the use of hydrated lime.

SUMMARY

This disclosure provides a lime hydrator integrated into a plant flue gas desulfurization system or other industrial system to provide an in situ variable production rate source of cured hydrated lime. This variable production rate source of cured hydrated lime may be used for an in situ variable supply rate of the produced cured hydrated lime to a plant flue gas desulfurization system for flue gas acid gas reduction. Further, this disclosure provides a method of using a lime hydrator integrated into a plant flue gas desulfurization system or other industrial system. The method of using the integrated lime hydrator in a plant flue gas desulfurization system or other industrial system provides an in situ variable production rate source of cured hydrated lime. This variable production rate source of cured hydrated lime may be used for an in situ variable supply rate of the produced cured hydrated lime to a plant flue gas desulfurization system for flue gas acid gas reduction. As such, the subject integrated lime hydrator comprises an elongated first stage housing and an elongated second stage housing. For purposes of increasing quicklime/hydrated lime residence time, the subject integrated lime hydrator may include more than one first stage housing. However, for purposes of clarity, simply a single first stage housing is described herein. As such, the subject first stage housing is elongated with a length of elongation arranged from 0 degrees to 180 degrees, but perpendicular, with respect to a length of elongation of the second stage housing for ease of maintenance thereof and/or equipment footprint reduction. This second stage housing is in fluid communication with the first stage housing for an in situ variable production rate source of cured hydrated lime. To this end, hydrated lime from the first stage housing is transported to the second stage housing for curing of the hydrated lime within the second stage housing, to produce cured hydrated lime. Cured hydrated lime is defined herein as fully hydrated lime of approximately 97 percent or greater hydration, or more approximately 99 percent or greater hydration. For purposes of clarity, a vertical reactor dry flue gas desulfurization (DFGD) system equipped with a distribution device as described in U.S. Pat. No. 5,887,973, incorporated herein its entirety by reference, is described herein as an exemplified embodiment of the subject integrated lime hydrator integrated into industrial equipment. However, the subject description is not intended to be limited by such exemplified embodiment. The subject lime hydrator is useful integrated with other industrial equipment used in industries using hydrated lime. Hence, only for purposes of clarity, the subject integrated lime hydrator is disclosed herein in fluid communication with a vertical reactor DFGD system via a distribution device associated therewith.

A quicklime conveyor is arranged in communication with the elongated first stage housing. The quicklime conveyor extends to a supply bottom outlet from a quicklime silo and quicklime feeder, or optionally from a mined limestone supply and grinder/calcinator. Within the quicklime silo, quicklime is stored prior to transport via a quicklime feeder to the quicklime conveyor. As an alternative source of quicklime, mined limestone from a mined limestone supply is ground within a limestone grinder into a fine powder using metal bearings or the like. This fine powder flows via gravity into a calcinator for calcination thereof to produce quicklime. This produced quicklime, or more quicklime from the quicklime silo, flows via the quicklime conveyor for release through the supply bottom outlet. Quicklime flowing out from the supply bottom outlet enters into a fluidly connected inlet of the first stage housing of the lime hydrator.

The first stage housing of the lime hydrator comprises opposed elongated side walls, an outwardly curved rounded elongated bottom arranged between and integrally formed with or attached to the two opposed elongated side walls, two opposed end walls attached between the elongated side walls, and a flat elongated top opposing the rounded elongated bottom for removable attachment to the side walls and two opposed end walls. In the flat elongated top adjacent a first of the two opposed end walls is an inlet in fluid communication with the supply bottom outlet of the quicklime conveyor. In the rounded elongated bottom adjacent a second of the two opposed end walls is a bottom outlet in fluid communication with an inlet of the second stage housing of the lime hydrator. The side walls, rounded elongated bottom, removable flat top and opposed end walls together define a first stage housing interior area. Within the first stage housing interior area is at least one rotating paddle set electronically controlled by a control device, and at least one water port, but more multiple water ports, through which water is introduced into the interior area of the first stage housing. By means of the rotating paddle set, quicklime is transported through the first stage housing from the inlet thereof to the bottom outlet thereof. During transport of the quicklime through the first stage housing, water is introduced through the at least one water port for rotating paddle set mixing with the quicklime to thereby produce hydrated lime. At the bottom outlet of the first stage housing is an adjustable control weir. Adjustments to the position of the adjustable control weir are useful to control temperature and residence time of the quicklime/hydrated lime within the first stage housing. Controlling temperature and residence time of the quicklime/hydrated lime within the first stage housing is to ensure the hydrated lime produced in the first stage housing is sufficiently hydrated to a point where the production of cured hydrated lime may be completed within the second stage housing. In the production of hydrated lime, temperature control is also important to control the quality of the hydrated lime so produced. For this purpose, temperature sensors are included at various locations throughout the interior area of the first stage housing with obtained temperature measurements used by a control device to calculate or determine if any temperature control adjustments are necessary. For example, if determined necessary, the control device may electronically control adjustments affecting the water feed rate into the interior area, the rotating paddle set rotation rate, the coolant feed rate through a cooling jacket at least partially surrounding the first stage housing, and/or the first stage housing adjustable control weir position, for temperature control through such one or more control device adjustments. Hydrated lime produced in the first stage housing is transported from the first stage housing through the bottom outlet past the adjustable control weir and into a second stage housing inlet.

The elongated second stage housing is arranged from 0 degrees to 180 degrees, but perpendicular, with respect to the elongated first stage housing and fluidly connected thereto. The elongated second stage housing and the elongated first stage housing together appear from a top view as an "L", wherein the vertical body of the "L" is the elongated first stage housing and the horizontal base of the "L" is the elongated second stage housing. This "L" arrangement of the elongated first stage housing and the elongated second stage housing is preferred as providing advantages with regard to ease of maintenance and reduced equipment footprint not available in all other arrangements. As an alternative, a "T" arrangement of the elongated first stage housing and the elongated second stage housing is possible, wherein the vertical body of the "T" is the elongated first stage housing and the horizontal top of the "T" is the elongated second stage housing. Such a "T" arrangement may provide certain advantages depending on plant equipment requirements and/or preferences. In accordance with the preferred "L" arrangement, the second stage housing like the first stage housing comprises two elongated opposed side walls, two opposed end walls arranged between the two elongated opposed side walls, an outwardly curved rounded bottom, and a removable flat top that together define an interior area. The flat top is removable for purposes of maintenance of the second stage housing. Arranged in the flat top adjacent a first of the two opposed end walls is the inlet of the second stage housing. As such, hydrated lime produced in the first stage housing flows through the bottom outlet of the first stage housing past the adjustable control weir and into the fluidly connected inlet of the second stage housing. Within the interior area of the second stage housing is at least one water port throughwhich water may be introduced into the interior area of the second stage housing for purposes of temperature control. Also within the interior area of the second stage housing is a rotating paddle set electronically controlled via a control device, operative for transport of hydrated lime toward the opposed end wall and out a side outlet thereof. During transport of the hydrated lime through the second stage housing, the temperature within the second stage housing is controlled for hydrated lime curing to produce cured hydrated lime. For this purpose as described above, temperature sensors are included at various locations throughout the interior area of the second stage housing with obtained temperature measurements used by a control device to calculate or determine if any temperature control adjustments are necessary. If determined necessary, the control device may electronically control adjustments affecting the paddle set rotation rate, water feed rate into the interior area, and/or coolant feed rate through an optional cooling jacket at least partially surrounding the second stage housing, for temperature control. Further, second stage housing temperature may be adjusted depending on varying cured hydrated lime quality requirements. The so produced cured hydrated lime is then transported through the outlet of the second stage housing and into an inlet of a vertical reactor DFGD system distribution device, or other such industrial equipment requiring a supply of cured hydrated lime.

The vertical reactor DFGD system distribution device is described in detail in U.S. Pat. No. 5,887,973. As such, the vertical reactor DFGD distribution device comprises an elongated container with an inlet for the introduction of cured hydrated lime from the outlet of the elongated second stage housing arranged in parallel with regard to the elongated container of the distribution device. Likewise, the distribution device may comprise an inlet for a supply of separated solid material from a fabric filter or elsewhere, for mixture with the cured hydrated lime. A spraying device is arranged in the elongated container of the distribution device for spaying liquid over the materials within the elongated container, such as the cured hydrated lime with or without separated solid material from a fabric filter or elsewhere.

Further, an agitator is arranged within an interior of the elongated container for mixing the liquid with the materials, namely, the cured hydrated lime to produce moistened hydrated lime, and an outlet is arranged in the elongated container for discharging the produced moistened hydrated lime for distribution within the DFGD system, such as within a "J" duct of a vertical reactor.

In one embodiment, the subject vertical reactor DFGD system comprises a "J" duct. Flue gas flows into the J duct where moistened hydrated lime is dispersed into the flow of flue gas flowing therethrough. The flue gas and the moistened hydrated lime entrained in the flue gas then flow in an upward direction through the vertical reactor portion of the J duct for flue gas and moistened hydrated lime intermixing and reaction. Through this flue gas and moistened hydrated lime intermixing and reaction, acid gas present in the flue gas is absorbed by the moistened hydrated lime to produce a reaction product dried by the flue gas, referred to herein as the "dry reaction product". The dry reaction product flows with the flue gas to a particulate collection device for separation and collection of the dry reaction product and like solid particulates from the flue gas, referred to herein collectively as "separated solid materials", to produce a cleaned flue gas of reduced acid gas content.

Installing the subject lime hydrator for integration into the vertical reactor DFGD system comprises arranging an elongated second stage housing in parallel with the vertical reactor DFGD distribution device elongated container, fluidly connecting the outlet of the elongated second stage housing with an inlet of the elongated container for a flow of cured hydrated lime from the outlet of the elongated second stage housing into the elongated container of the distribution device, arranging an elongated first stage housing from a 0 degree to a 180 degree angle, but perpendicular, with respect to the arrangement of the elongated second stage housing, and fluidly connecting the elongated first stage housing bottom outlet with an inlet of the second stage housing for a flow of hydrated lime from the bottom outlet past the adjustable control weir of the first stage housing into the inlet of the second stage housing. In addition thereto, a quicklime conveyor is arranged to extend from a quicklime silo and quicklime feeder, or alternatively from a mined limestone supply and limestone grinder/calcinator, to the first stage housing. As such, a supply bottom outlet of the quicklime conveyor is fluidly connected to an inlet of the first stage housing, for a flow of quicklime into the first stage housing of the subject integrated lime hydrator.

Maintenance of the subject integrated lime hydrator integrated into a vertical reactor DFGD system comprises separating the elongated first stage housing bottom outlet from an inlet of the second stage housing, separating the supply bottom outlet of the quicklime conveyor from the inlet of the first stage housing, opening up the second stage housing flat top, and opening up the first stage housing flat top for maintaining the elongated second stage housing and/or the elongated first stage housing, and/or the associated quicklime conveyor.

In summary, the subject integrated lime hydrator comprises a first stage housing equipped with at least one rotating paddle set, an adjustable control weir, a supply of water and a supply of quicklime, operative to produce hydrated lime within the first stage housing, and a second stage housing equipped with a rotating paddle set, a supply of water, and a supply of hydrated lime from the first stage housing operative to produce cured hydrated lime. The subject lime hydrator is integrated with a distribution device of a DFGD system. The distribution device, equipped with a supply of water, a supply of cured hydrated lime from the second stage housing, and optionally a supply of separated solid material from a fabric filter or elsewhere, is operative to produce moistened hydrated lime for distribution of the moistened hydrated lime within a vertical reactor of the DFGD system. The vertical reactor is arranged with a flow of flue gas therethrough for contact and reaction of the moistened hydrated lime with the flue gas for flue gas acid gas removal to produce a cleaned flue gas. Further, the associated quicklime conveyor is supplied quicklime from a quicklime silo and quicklime feeder, or optionally from a grinder and calcinator. Also, the first stage housing is equipped with a cooling jacket operative as one source of temperature control, for maintaining the first stage housing interior temperature in the range of about 50 degrees Celsius to about 200 degrees Celsius, or about 150 degrees Celsius. The first stage housing is also equipped with an adjustable control weir with manually or electronically controlled position adjustment for control of hydrated lime residence time within the first stage housing. Also, temperature sensors are included at various locations throughout the interior area of the first stage housing with obtained temperature measurements used by a control device to calculate or determine if any temperature control adjustments are necessary to affect the water feed rate to the interior area, the rotating paddle set rate of rotation, the coolant feed rate through a cooling jacket at least partially surrounding the first stage housing, and/or first stage housing adjustable control weir position, for temperature control thereby. Hydrated lime produced in the first stage housing is transported from the first stage housing through the bottom outlet over the adjustable control weir and into a second stage housing inlet. The second stage housing is operated with a second stage housing interior temperature in the range of about 50 degrees Celsius to about 200 degrees Celsius, or about 150 degrees Celsius for curing of the hydrated lime to produce cured hydrated lime.

In summary, a method of using the subject integrated lime hydrator comprises hydrating quicklime to produce hydrated lime in a first stage housing equipped with at least one rotating paddle set, a supply of water, a supply of quicklime and an adjustable control weir for control of produced hydrated lime residence time within the first stage housing, and curing the hydrated lime to produce cured hydrated lime in a second stage housing equipped with a rotating paddle set, a supply of hydrated lime from the first stage housing and a supply of water for temperature control. The so produced cured hydrated lime is transported by the rotating paddle set to a distribution device. The distribution device equipped with the supply of cured hydrated lime from the second stage housing, an optional supply of separated solid material from a fabric filter or elsewhere, and a supply of water is operative to produce moistened hydrated lime for distribution of the moistened hydrated lime within a vertical reactor. The vertical reactor is equipped with a flow of flue gas for contact and reaction of the moistened hydrated lime with the flue gas for flue gas acid gas removal to produce a cleaned flue gas. The subject method further comprises supplying the quicklime to the first stage housing via a quicklime conveyor fluidly connected to a quicklime silo and a quicklime feeder, or alternatively, to a limestone grinder and calcinator. The method also comprises equipping the first stage housing with a cooling jacket operative as a source of temperature control for maintaining the first stage housing interior temperature in the range of about 50 degrees Celsius to about 200 degrees Celsius, or about 150 degrees Celsius. The method also comprises operating the second stage housing at an interior temperature in the range of about 50 degrees Celsius to about 200 degrees Celsius, or about 150 degrees Celsius. The subject method further comprises controlling the supply of water to the first stage housing, controlling the rate of rotation of the rotating paddle set of the first stage housing, controlling the temperature of the first stage housing, controlling the quicklime/hydrated lime residence time within the first stage housing, controlling the supply of water, if any, to the second stage housing, controlling the rate of rotation of the rotating paddle set of the second stage housing, and controlling the temperature of the second stage housing, electronically using a control device.

The subject systems and methods may be further summarized as a plant comprising an integrated lime hydrator comprising at least one first stage housing equipped with an adjustable control weir, a water supply, a rotating paddle set and a quicklime supply, operative to produce hydrated lime. The subject integrated lime hydrator further comprises a second stage housing equipped with a water supply, a rotating paddle set and a hydrated lime supply from the first stage housing operative to produce cured hydrated lime. The integrated lime hydrator is integrated with a distribution device equipped with a water supply, a cured hydrated lime supply from the second stage housing, and optionally a supply of separated solid material from a fabric filter or elsewhere. The distribution device is operative to produce moistened hydrated lime and to distribute the moistened hydrated lime in a reactor equipped with a flow of flue gas, for moistened hydrated lime distribution within the flow of flue gas, to reduce flue gas acid gas to thereby produce a cleaned flue gas. For this purpose, quicklime is supplied to the first stage housing from a quicklime silo via a feeder and a conveyor. The first stage housing is also equipped with a cooling jacket operative for temperature control, for first stage housing operation at a temperature in the range of about 50 degrees Celsius to about 200 degrees Celsius, or about 150 degrees Celsius. The water supply, quicklime supply, adjustable control weir position and temperature of the first stage housing are each controlled through adjustments by a control device. Further, temperature sensors are arranged in the first stage housing and the second stage housing to obtain temperature measurements received and used by the control device for temperature control. The second stage housing of the subject integrated lime hydrator is operated at a temperature in the range of about 50 degrees Celsius to about 200 degrees Celsius, or about 150 degrees Celsius. A method of using the subject lime hydrator integrated in a plant comprises producing hydrated lime in at least one first stage housing equipped with an adjustable control weir, a rotating paddle set, a water supply, and a quicklime supply, and producing cured hydrated lime in-situ in a second stage housing equipped with a water supply and a hydrated lime supply from the at least one first stage housing. The method further comprises producing in a distribution device equipped with a water supply, a cured hydrated lime supply from the second stage housing, and optionally a supply of separated solid material from a fabric filter or elsewhere, moistened hydrated lime. The method further comprises reacting in a vertical reactor equipped with a flow of flue gas and moistened hydrated lime supplied from the distribution device, the moistened hydrated lime with acid gas present in the flow of flue gas for flue gas acid gas reduction to thereby produce a cleaned flue gas. The method further comprises equipping the first stage housing with a cooling jacket operative for temperature control. The method further comprises operating the first stage housing at a temperature in the range of about 50 degrees Celsius to about 200 degrees Celsius, or about 150 degrees Celsius. The method further comprises operating the second stage housing at a temperature in the range of about 50 degrees Celsius to about 200 degrees Celsius, or about 150 degrees Celsius. The method further comprises controlling the water supply, the quicklime supply, the adjustable control weir position, an operating temperature of the first stage housing, and an operating temperature of the second stage housing electronically using a control device.

BRIEF DESCRIPTION OF THE DRAWINGS

Embodiments of the subject disclosure will be described in more detail with reference to the accompanying drawings, in which.

DETAILED DESCRIPTION

Figure 1:
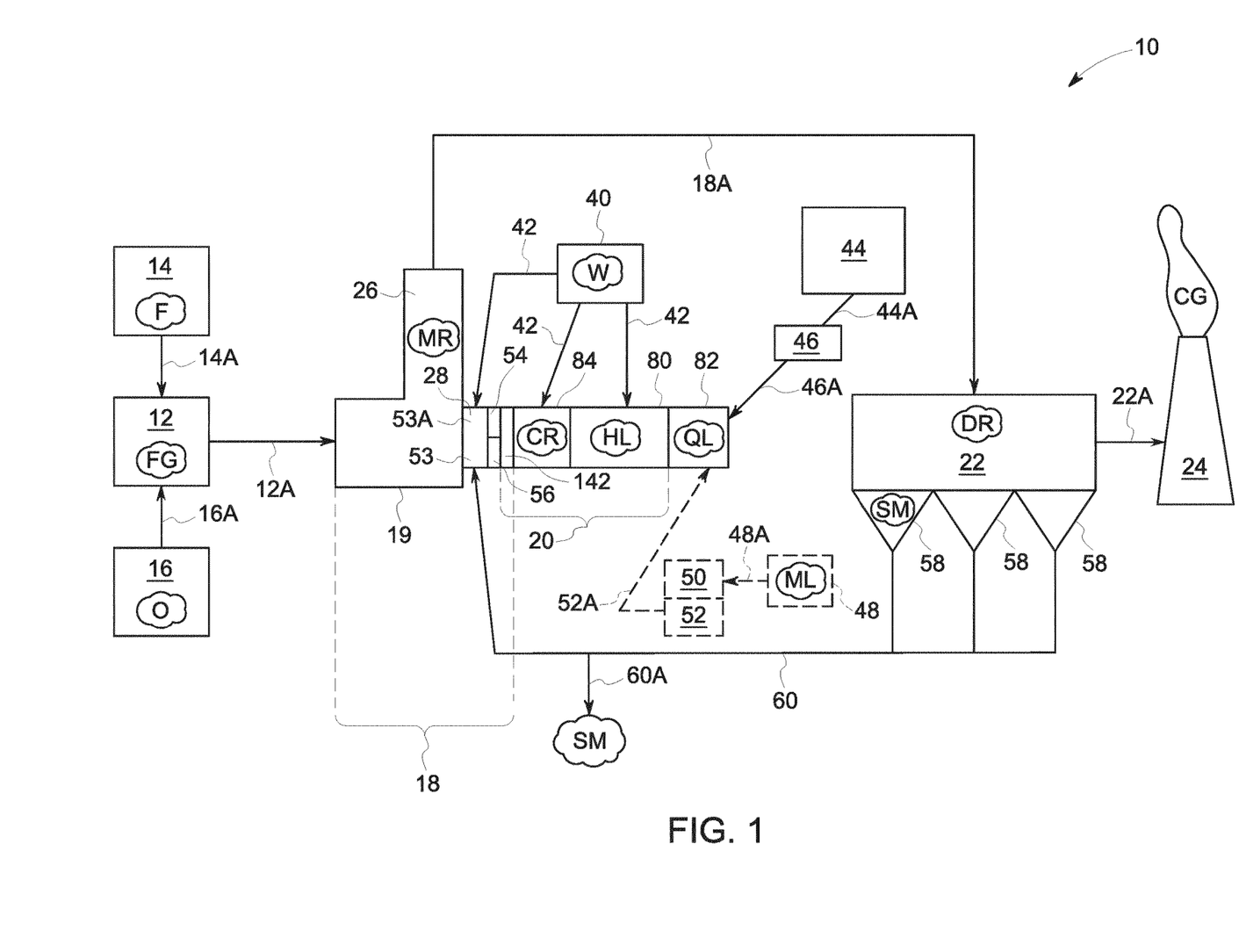
FIG. 1 is a schematic side cross sectional view of a plant equipped with a vertical reactor flue gas desulfurization system with an embodiment of the subject integrated lime hydrator integrated therein.

A plant 10 in accordance with the subject disclosure as illustrated in FIG. 1, includes a combustion unit 12, a dry flue gas desulfurization (DFGD) system 18, a particulate collector 22 and a stack 24. It is noted that many additional and varied process steps using additional equipment may take place or be arranged between combustion unit 12 and DFGD system 18, as is known to those skilled in the art. Likewise, many additional and varied process steps using additional equipment may take place or be arranged between DFGD system 18 and stack 24, as is known to those skilled in the art. Such additional process steps and/or equipment are not described herein in further detail for purposes of clarity and simplicity.

As noted previously, FIG. 1 illustrates schematically a plant 10 with a DFGD system 18 for reducing acid gas in flue gas FG generated in combustion unit 12 by combustion of a fuel F therein. As such, fuel F is supplied to combustion unit 12 through duct 14A from a fluidly connected fuel source 14. Fuel F may be a coal, a liquid fuel, a gas, or other like fossil or non-fossil fuel, e.g., household garbage. Likewise, an oxygen containing gas O such as air may be supplied to the combustion unit 12 via a duct 16A from an oxygen containing gas source 16. Hot flue gas FG produced by the combustion of fuel F in combustion unit 12 contains $SO_2$, $SO_3$, HCl, HF, fly ash particulates and/or like solid particulates/acidic pollutants. The hot flue gas FG flows from combustion unit 12 through a fluidly connected flue gas duct 12A. Flue gas duct 12A fluidly connects to a "J" duct 19 of a dry scrubber or vertical reactor 26. In fluid communication with vertical reactor 26 is a distribution device 28 and a fluidly connected integrated lime hydrator 20. Distribution device 28 introduces, in a manner such as that disclosed in WO 96/16727, a moistened hydrated lime MR reducing agent such as calcium oxide and/or calcium hydroxide into the flue gas FG flowing through vertical reactor 26. For this purpose, water W from a water supply 40 flows through a fluidly connected pipe 42 to fluidly connected distribution device 28. Water W from the water supply 40 also flows through fluidly connected pipe 42 to fluidly connected integrated lime hydrator 20. As an alternative, distribution device 28 and integrated lime hydrator 20 may have separate water supplies and separate piping depending on plant 10 cost considerations. Likewise, quicklime is supplied from a quicklime silo 44 through duct 44A through a quicklime feeder 46 fluidly connected to a quicklime conveyor 82 via duct 46A. The quicklime conveyor 82 is fluidly connected to a first stage housing 80 of the integrated lime hydrator 20, as disclosed in greater detail below. Optionally, rather than using a quicklime silo 44, mined limestone ML from a mined limestone supply 48 may be transported via duct 48A to a grinder 50 for grinding of the mined limestone ML into a fine powder, which is then gravity fed to a calcinator 52 for calcination to produce quicklime QL supplied to quicklime conveyor 82 via duct 52A. This option of using mined limestone ML is illustrated in FIG. 1 in dotted lines.

Distribution device 28 comprises a container 53 essentially in the shape of an elongated box defining an open interior area 53A. Container 53 comprises a motor 54 and a mixer 56 for mixing together water W from water supply 40, optionally a portion of separated solid materials SM collected in hoppers 58 via duct 60, and cured hydrated lime CR supplied thereto from integrated lime hydrator 20, to produce moistened hydrated lime MR having a water content of approximately 1 percent to approximately 6 percent, or approximately 3 percent. Moistened hydrated lime MR is uniformly distributed by the distribution device 28 into the fluidly connected vertical reactor 26 of dry flue gas desulfurization (DFGD) system 18. As such, moistened hydrated lime MR may be continuously introduced into vertical reactor 26 for uniform distribution and intermixing contact with the flue gas FG flowing therethrough. The moistened hydrated lime MR reacts with acid gas in the flue gas FG to thereby reduce or remove acid gas from the flue gas FG to produce a cleaned flue gas CG. After intermixing contact with the flue gas FG, the resultant dry reaction product DR entrained by the flue gas FG flows via duct 18A to a fluidly connected particulate collector 22, such as a fabric filter, an electrostatic precipitator or the like. Solid particulates carried in the flue gas FG including dry reaction product DR is separated from the flow of flue gas FG and collected in hoppers 58 of particulate collector 22 as separated solid materials SM. The separated solid materials SM collected in hoppers 58 are transported through fluidly connected duct 60 to fluidly connected container 53 for mixture with the cured hydrated lime CR to produce moistened hydrated lime MR therein. Alternatively, a portion of the separated solid materials SM collected in hoppers 58 may be transported elsewhere for other purposes or discarded in an environmentally conservative manner via duct 60A. Cleaned flue gas CG exits particulate collector 22 via fluidly connected duct 22A for release to the atmosphere via fluidly connected stack 24.

During plant 10 operation, flue gas FG desulfurization demand varies depending on sulfur content of the fuel F and hence, the sulfur content of the flue gas FG produced, environmental emissions requirements, and the like. The in situ supply of cured hydrated lime CR follows the desulfurization demand, and thus varies accordingly. For example, at times of relatively low desulfurization demand, the integrated lime hydrator 20 electronically controlled by control device 118 is operative, if desired, at a relatively reduced in situ production and/or supply rate of cured hydrated lime CR for transport to the distribution device 28. At times of relatively low desulfurization demand, the rate of dispersal of moistened hydrated lime MR, and thereby consumption of cured hydrated lime CR, by distribution device 28 into vertical reactor 26 is relatively reduced. Likewise, at times of relatively high desulfurization demand, the integrated lime hydrator 20 electronically controlled by control device 118 is operative, if desired, at a relatively increased in situ production and/or supply rate of cured hydrated lime CR for transport to the distribution device 28. At times of relatively high desulfurization demand, the rate of dispersal of moistened hydrated lime MR, and thereby the consumption of cured hydrated lime CR, by distribution device 28 into vertical reactor 26 is relatively increased.

Figure 2:
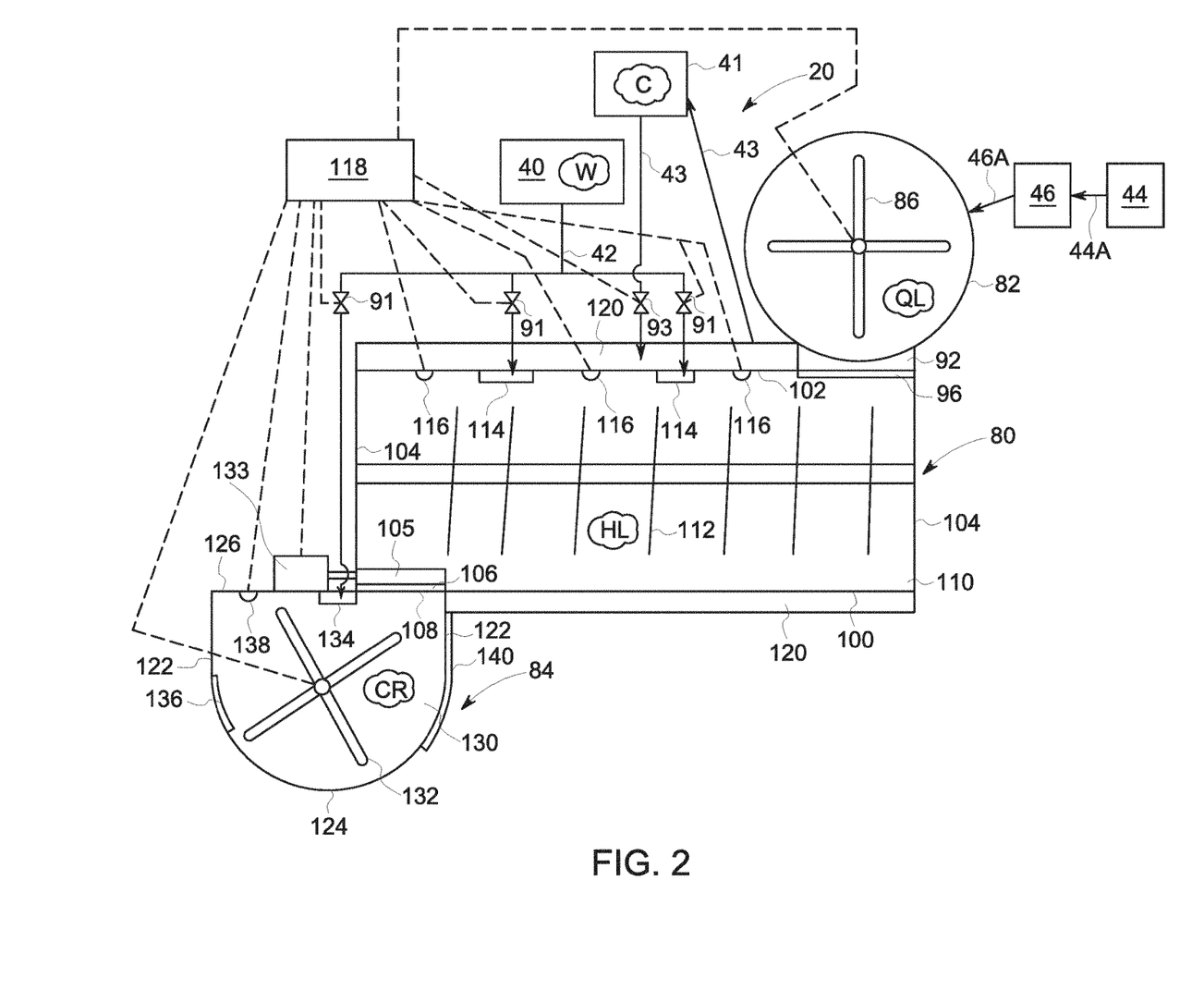
FIG. 2 is an enlarged schematic side cross sectional view of the subject integrated lime hydrator equipped with a quicklime conveyor of FIG. 1.
Figure 3:
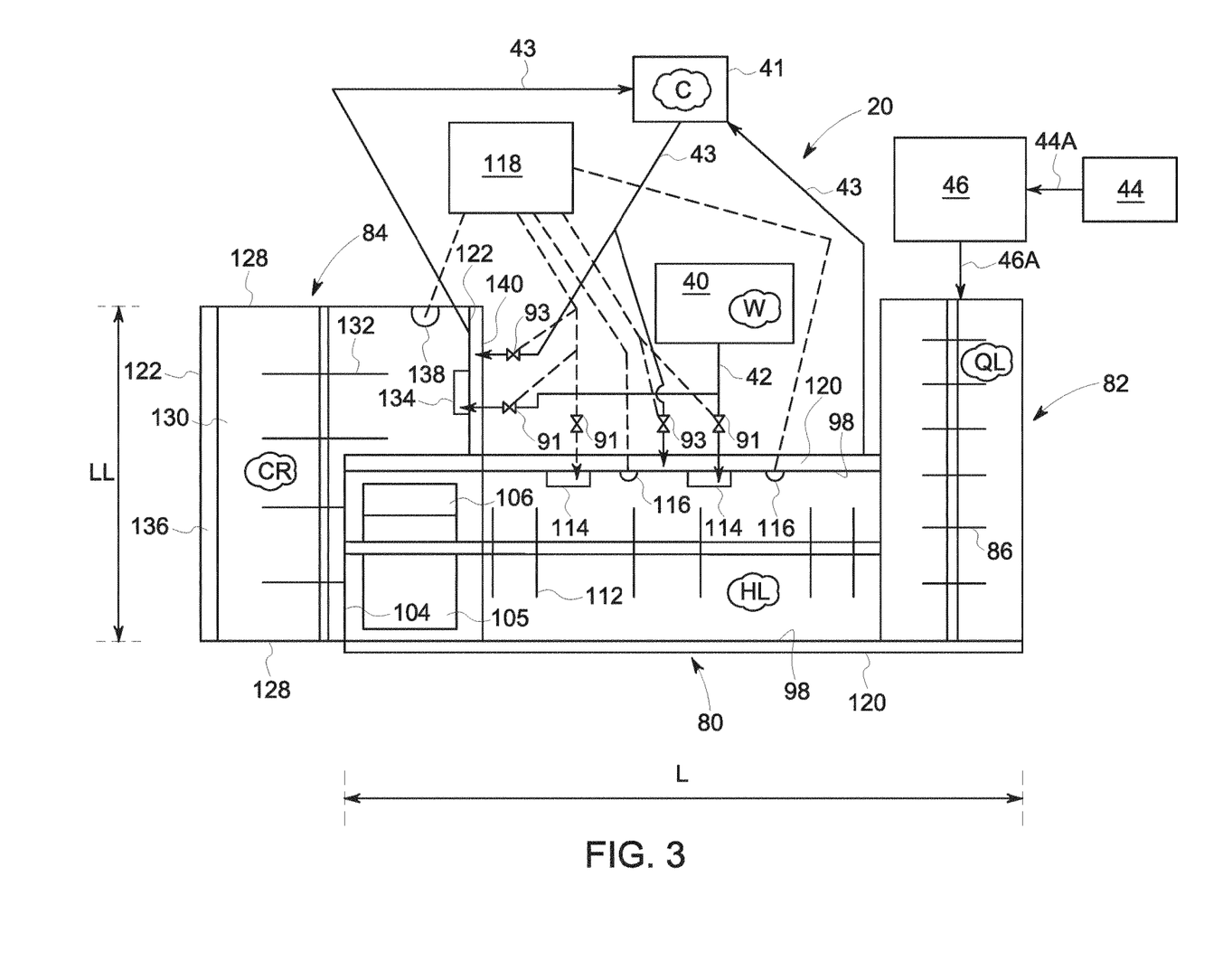
FIG. 3 is an enlarged schematic top cross sectional view of the subject integrated lime hydrator equipped with a quicklime conveyor of FIG. 1.

Illustrated in FIGS. 2 and 3 is a first embodiment of the subject integrated lime hydrator 20. This first embodiment of the subject integrated lime hydrator 20 comprises an elongated first stage housing 80. This first stage housing 80 is elongated with a length L of elongation arranged from a 0 degree to a 180 degree angle, but perpendicular with respect to a length LL of elongation of an elongated second stage housing 84, as best illustrated in FIG. 3. This second stage housing 84 is in fluid communication with the first stage housing 80. The second stage housing 84 is attached to and in fluid communication with a vertical reactor 26 via distribution device 28 associated therewith as described in U.S. Pat. No. 5,887,973 incorporated herein its entirety by reference.

A quicklime conveyor 82 is equipped with a motor-driven conveyor set 86 electronically controlled by control device 118, and extends from a quicklime feeder 46 duct 46A and quicklime silo 44 duct 44A, to a supply bottom outlet 92. From the quicklime conveyor 82, quicklime QL flows out from the supply bottom outlet 92 and enters into an inlet 96 of the first stage housing 80. The first stage housing 80 comprises opposed elongated side walls 98, an outwardly curved rounded elongated bottom 100 arranged between and integrally formed with or attached to the two opposed elongated side walls 98, two opposed end walls 104 attached between the two opposed elongated side walls 98, and a removable flat elongated top 102 opposing the rounded elongated bottom 100 for removable attachment to the elongated side walls 98 and two opposed end walls 104. Flat elongated top 102 is provided with removable attachment for purposes of first stage housing 80 maintenance. A first of the two opposed end walls 104 is adjacent the inlet 96 in flat elongated top 102 in communication with the supply bottom outlet 92 of the quicklime conveyor 82. A second of the two opposed end walls 104 is adjacent an adjustable control weir 105 at a bottom outlet 106 in communication with an inlet 108 of the second stage housing 84. The side walls 98, rounded elongated bottom 100, flat top 102 and opposed end walls 104 together define a first stage housing interior area 110. Arranged within the first stage housing 80 interior area 110 is at least one motor-driven rotating paddle set 112 and at least one water port 114, but more multiple water ports 114, throughwhich water W from water supply 40 via fluidly connected pipe 42 equipped with control valves 91 is introduced into the interior area 110. The at least one rotating paddle set 112, transports quicklime QL the length L of first stage housing 80 from the inlet 96 to the adjustable control weir 105 at the bottom outlet 106, thereof. During transport of the quicklime QL through the first stage housing 80, water W from water supply 40 via fluidly connected pipe 42 equipped with control valves 91 is introduced through the at least one water port 114 for mixing with the quicklime QL to thereby produce hydrated lime HL. Adjustments to the position of the adjustable control weir 105 are useful to control temperature and residence time of the quicklime QL/hydrated lime HL within the first stage housing 80. Controlling temperature and residence time of the quicklime QL/hydrated lime HL within the first stage housing 80 is to ensure the hydrated lime HL produced in the first stage housing 80 is sufficiently hydrated to a point where the production of cured hydrated lime CR may be completed within the second stage housing 84. In the production of hydrated lime HL, temperature control is important to control the quality of the hydrated lime HL produced. For this purpose, temperature sensors 116 are arranged at various locations throughout the interior area 110 to continuously or intermittently measure temperatures within interior area 110 to obtain temperature measurements. Temperature sensors 116 electronically transmit the obtained temperature measurements for receipt and use thereof by a control device 118 for comparisons, calculations and/or determinations using data programmed, previously stored or entered into control device 118. Based on these comparisons, calculations and/or determinations, control device 118 electronically controls any necessary mechanical adjustments to affect the water feed rate via control valves 91, rotating paddle set 112 rotation rate, coolant C circulation rate through a cooling jacket 120, and/or adjustable control weir 105 position for integrated lime hydrator 20 temperature control. As such, using control device 118, quicklime QL/hydrated lime HL hydration temperature is controlled as desired depending upon the particular characteristics of the quicklime, e.g., calcium oxide content, particle size, surface area, and the like, being hydrated and the targeted properties desired for the hydrated lime HL being produced. For example, if temperature measurements from temperature sensors 116 are higher than data programmed, previously stored, or entered into control device 118, control device 118 may increase the water W feed rate via control valves 91, increase the rotating paddle set 112 rotation rate, alter the position of the adjustable control weir 105 for less coverage of bottom outlet 106, and/or increase coolant C circulation rate through cooling jacket 120 at least partially surrounding first stage housing 80 via control valve 93. If temperature measurements from temperature sensors 116 are relatively the same as data programmed, previously stored, or entered into control device 118, control device 118 may initiate no adjustments to the water W feed rate via control valves 91, the rotating paddle set 112 rotation rate, the position of the adjustable control weir 105, and/or the coolant C circulation rate through the cooling jacket 120 via control valve 93. If temperature measurements from temperature sensors 116 are lower than data programmed, previously stored, or entered into control device 118, control device 118 may decrease the water W feed rate via control valves 91, decrease the rotating paddle set 112 rotation rate, alter the position of the adjustable control weir 105 for greater coverage of the bottom outlet 106, and/or decrease the coolant C circulation rate through the cooling jacket 120 via control valve 93. As noted above, the first stage housing 80 is equipped with a cooling jacket 120 as one source of temperature control. As such, cooling jacket 120 at least partially surrounds the first stage housing 80 with a supply of coolant C, such as for example cool water circulated therethrough from a coolant supply 41 via fluidly connected pipe 43 also controlled by control device 118 via valve 93.

Hydrated lime HL produced in the first stage housing 80 is transported through first stage housing 80 over adjustable control weir 105 at bottom outlet 106, as discussed in more detail below, and into elongated second stage housing 84 inlet 108. The elongated second stage housing 84 is fluidly connected to and arranged at a 0 degree to a 180 degree angle, but perpendicular with respect to the elongated first stage housing 80, together appearing from a top view as an "L", wherein the vertical body of the "L" is the elongated first stage housing 80 and the bottom horizontal cross bar of the "L" is the elongated second stage housing 84. As an alternative, a "T" arrangement of the elongated first stage housing 80 and the elongated second stage housing 84, wherein the vertical body of the "T" is the elongated first stage housing 80 and the horizontal top of the "T" is the elongated second stage housing 84, may provide certain advantages depending on plant equipment requirements and/or preferences. In the preferred "L" configuration, the second stage housing 84 like the first stage housing 80 comprises two elongated opposed side walls 122, an outwardly curved rounded bottom 124, a removable flat top 126, and two opposed end walls 128 that together define an interior area 130. Arranged in the flat top 126 adjacent one of the end walls 128, is the inlet 108 of the second stage housing 84. As such, hydrated lime HL produced in the first stage housing 80 flows over the adjustable control weir 105 at a bottom outlet 106 of the first stage housing 80 and into the inlet 108 of the second stage housing 84. Within the interior area 130 of the second stage housing 84 is a motor-driven rotating paddle set 132 operative for transport of hydrated lime HL, and an optional water port 134 throughwhich water W from water supply 40 via fluidly connected pipe 42 equipped with a control valve 91, may be supplied into the interior area 130. By means of the rotating paddle set 132 electronically controlled by control device 118, hydrated lime HL is transported through the second stage housing 84 from the inlet 108 thereof to the outlet 136 extending between a side wall 122 and rounded bottom 124. During transport of the hydrated lime HL through the second stage housing 84 the hydrated lime HL is cured to produce cured hydrated lime CR. Cured hydrated lime is defined herein as fully hydrated lime of approximately 97 percent or greater hydration, or more approximately 99 percent or greater hydration. In the production of cured hydrated lime CR, temperature control is important for efficient production and for controlling the quality of the cured hydrated lime CR produced. For this purpose, temperature sensors 138 are included at various locations throughout the interior area 130 with sensor data electronically received and used by control device 118 to compare, calculate and/or determine from programmed, previously stored or entered data, any necessary mechanical adjustments required. As such, the control device 118 electronically controls any necessary mechanical adjustments to affect the water W (if any) feed rate via control valve 91, and/or the rotating paddle set 132 rotation rate for temperature control based thereon. Optionally, the second stage housing 84 may be equipped with a cooling jacket 140 as another source of temperature control. As such, optional cooling jacket 140 at least partially surrounds the second stage housing 84 with a supply of coolant C, such as for example cooled water, circulated therethrough from fluidly connected coolant supply 41 via fluidly connected pipe 43 equipped with a control valve 93.

Using the subject integrated lime hydrator 20, water W supply rates and housing 80,84 temperatures may be controlled via control device 118 depending on varying hydrated lime HL quality requirements and in situ cured hydrated lime CR production requirements for supply to distribution device 28. For example, when plant 10 operates under relatively low desulfurization demand, such as when combusting a relatively low sulfur content fuel, the subject integrated lime hydrator 20 may be operated to produce in situ relatively a lesser amount of cured hydrated lime CR. When plant 10 operates under relatively moderate desulfurization demand, the subject integrated lime hydrator 20 may be operated for relatively moderate production in situ of cured hydrated lime CR. When the plant 10 operates under relatively high desulfurization demand, such as when combusting a relatively high sulfur content fuel, the subject integrated lime hydrator 20 may be operated to produce in situ relatively a greater amount of cured hydrated lime CR. Produced cured hydrated lime CR is transported through the outlet 136 of the second stage housing 84 and into an inlet 142 of distribution device 28.

A method of using the subject integrated lime hydrator 20 comprises transporting quicklime QL from a quicklime silo 44 via duct 44A through a quicklime feeder 46 to a quicklime conveyor 82 via duct 46A, supplying quicklime QL from the quicklime conveyor 82 through a supply bottom outlet 92 into an inlet 96 of a first stage housing 80, hydrating the quicklime QL with water in the first stage housing 80 to produce hydrated lime HL, controlling residence time of the hydrated lime HL within the first stage housing through positioning of an adjustable control weir, supplying hydrated lime HL from the first stage housing 80 to a second stage housing 84 for curing of the hydrated lime HL to produce cured hydrated lime CR, supplying the cured hydrated lime CR from the second stage housing 84 to a DFGD system 18 distribution device 28 optionally with or without separated solid material SM from a fabric filter 22 via duct 60 to produce moistened hydrated lime MR for distribution device 28 dispersal of moistened hydrated lime MR into vertical reactor 26, contacting flue gas FG flowing through vertical reactor 26 with dispersed moistened hydrated lime MR for reaction with flue gas FG acid gas to produce a dry reaction product DR entrained by the flue gas FG, separating solid particulates and dry reaction product DR from the flue gas FG in a particulate collector 22 to collect separated solid materials SM and to produce cleaned flue gas CG, and releasing the cleaned flue gas CG to the environment via stack 24.

Figure 4:
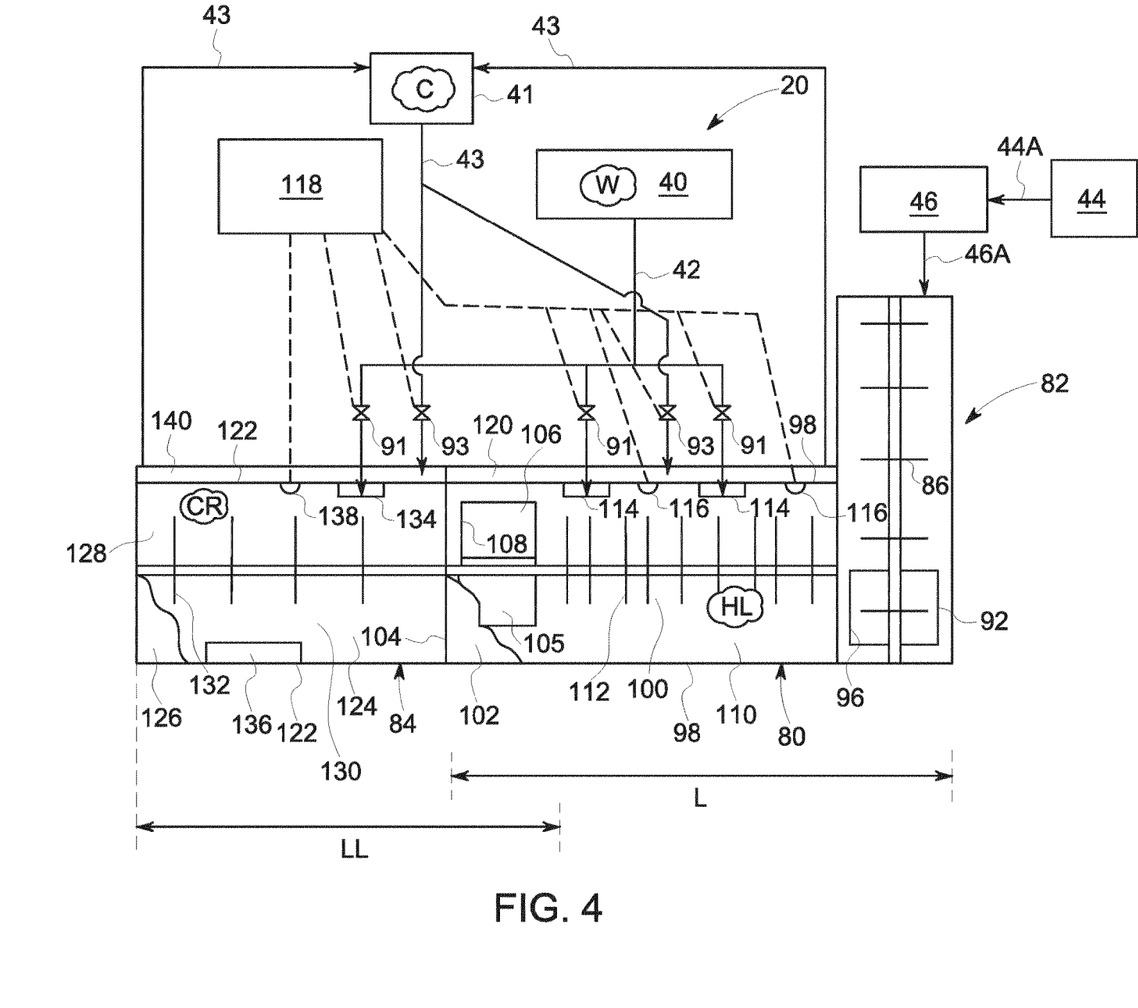
FIG. 4 is an enlarged schematic top cross sectional view of another embodiment of the subject integrated lime hydrator equipped with a quicklime conveyor.

Illustrated in FIG. 4 is another embodiment of the subject integrated lime hydrator 20 having many features the same or similar to those of the embodiment illustrated in FIGS. 2 and 3. As such, features of the subject embodiment of FIG. 4 the same or similar to those of the embodiment of FIGS. 2 and 3 are identified herein with like reference numbers. New features of the subject embodiment of FIG. 4 are illustrated with new reference numbers. The subject integrated lime hydrator 20 of FIG. 4 comprises an elongated first stage housing 80 with a quicklime conveyor 82 in fluid communication therewith. This first stage housing 80 is elongated with a length L of elongation arranged aligned with respect to a length LL of elongation of an elongated second stage housing 84. This second stage housing 84 is in fluid communication with the first stage housing 80. The second stage housing 84 is also attached to and in fluid communication with distribution device 28 of vertical reactor 26 described in U.S. Pat. No. 5,887,973 incorporated herein its entirety by reference.

The quicklime conveyor 82 is fluidly connected to a duct 46A of a quicklime feeder 46 and duct 44A of a quicklime silo 44. Quicklime conveyor 82 extends from duct 46A of the quicklime feeder 46 to a supply bottom outlet 92. As such, quicklime QL flows from the quicklime silo 44 via duct 44A through the quicklime feeder 46 to the quicklime conveyor 82 via duct 46A for a supply of quicklime QL through supply bottom outlet 92. As such, quicklime QL flows out from the supply bottom outlet 92 entering into an inlet 96 of the first stage housing 80.

The first stage housing 80 comprises opposed elongated side walls 98, an outwardly curved rounded elongated bottom 100 arranged between and integrally formed with or attached to the two opposed elongated side walls 98, two opposed end walls 104 attached between the opposed elongated side walls 98, and a removable flat elongated top 102, illustrated in partial break-away, opposing the rounded elongated bottom 100 for removable attachment to the elongated side walls 98 and two opposed end walls 104. The removable flat elongated top 102 may be removed for maintenance of first stage housing 80. The flat elongated top 102 adjacent a first of the two opposed end walls 104 includes the inlet 96 in fluid communication with the supply bottom outlet 92 of the quicklime conveyor 82. Adjacent a second of the two opposed end walls 104 in elongated bottom 100, is an adjustable control weir 105 at bottom outlet 106 in communication with an inlet 108 of the second stage housing 84. The side walls 98, rounded elongated bottom 100, flat top 102 and opposed end walls 104 together define a first stage housing interior area 110. Within the first stage housing 80 interior area 110 is at least one motor-driven rotating paddle set 112 and at least one water port 114, but multiple water ports 114, throughwhich water W, from water supply 40 via fluidly connected pipe 42 equipped with control valves 91 electronically controlled via control device 118, is introduced into the interior area 110. By means of the at least one rotating paddle set 112, quicklime QL is transported the length L of first stage housing 80 from the inlet 96 toward the adjustable control weir 105 at bottom outlet 106 thereof. During transport of the quicklime QL through the first stage housing 80, water W from water supply 40 via fluidly connected pipe 42 equipped with control valves 91 electronically controlled via control device 118, is introduced through the at least one water port 114 for mixing with the quicklime QL to thereby produce hydrated lime HL. Adjustments to the position of the adjustable control weir 105 are useful to control temperature and residence time of the quicklime QL/hydrated lime HL within the first stage housing 80. Controlling temperature and residence time of the quicklime QL/hydrated lime HL within the first stage housing 80 is to ensure the hydrated lime HL produced in the first stage housing 80 is sufficiently hydrated to a point where the production of cured hydrated lime CR may be completed within the second stage housing 84. In the production of hydrated lime HL, temperature control is important to control the quality of the hydrated lime HL produced. For this purpose, temperature sensors 116 are arranged at various locations throughout the interior area 110 to continuously or intermittently measure temperatures within interior area 110 to obtain temperature measurements. Temperature sensors 116 electronically transmit the temperature measurements for receipt and use by a control device 118 for comparisons, calculations and/or determinations using data programmed, previously stored or entered into control device 118. Based on these comparisons, calculations and/or determinations, control device 118 electronically controls any necessary mechanical adjustments to affect the water W feed rate via control valves 91, rotating paddle set 112 rotation rate, adjustable control weir 105 position, and/or cooling jacket 120 coolant C circulation rate via control valve 93, for integrated lime hydrator 20 temperature control. For example, if temperature measurements from temperature sensors 116 are higher than data previously programmed, stored or entered into control device 118, control device 118 electronically controls mechanical adjustments necessary to affect increases in the water W feed rate via control valves 91, increases in the rotating paddle set 112 rotation rate, decreases in the adjustable control weir 105 coverage of bottom outlet 106, and/or increases in the coolant C circulation rate through cooling jacket 120 via control valve 93. If temperature measurements from temperature sensors 116 are relatively the same as data previously programmed, stored or entered into control device 118, control device 118 may not electronically control any mechanical adjustments to affect the water W feed rate via control valves 91, the rotating paddle set 112 rotation rate, the adjustable control weir 105 position, and/or the coolant C circulation rate through cooling jacket 120 via control valve 93. If temperature measurements from temperature sensors 116 are lower than data programmed, previously stored or entered into control device 118, control device 118 electronically controls mechanical adjustments necessary to affect decreases in the water W feed rate via control valves 91, decreases in the rotating paddle set 112 rotation rate, increases in the adjustable control weir 105 coverage of bottom outlet 106, and/or decreases in the coolant C circulation rate through cooling jacket 120 via control valve 93. As noted above, the first stage housing 80 is equipped with a cooling jacket 120 as a source of temperature control. As such, cooling jacket 120 at least partially surrounds the first stage housing 80 with a supply of coolant C, such as for example cool water, circulated therethrough from coolant supply 41 via pipes 43, with circulation rate controlled by control device 118 via control valve 93.

Hydrated lime HL produced in the first stage housing 80 is transported through first stage housing 80 over adjustable control weir 105 at bottom outlet 106 and into elongated second stage housing 84 inlet 108. The elongated second stage housing 84 is arranged aligned with respect to the elongated first stage housing 80. The second stage housing 84 like the first stage housing 80 comprises two elongated opposed side walls 122, an outwardly curved rounded bottom 124, a removable flat top 126, illustrated in partial break-away, and two opposed end walls 128 that together define an interior area 130. Flat top 126 is removable for maintenance of second stage housing 84. Arranged in the flat top 126 adjacent one of the end walls 128 as in the first stage housing 80, is inlet 108 of the second stage housing 84. As such, hydrated lime HL produced in the first stage housing 80 flows past the adjustable control weir 105 at bottom outlet 106 of the first stage housing 80 and into the inlet 108 of the second stage housing 84. Within the interior area 130 of the second stage housing 84 is a motor-driven rotating paddle set 132 operative for transport of hydrated lime HL therethrough. Optionally, water W from water supply 40 via water port 134 and fluidly connected pipe 42 equipped with a control valve 91, may be supplied to the interior area 130. By means of the rotating paddle set 132, hydrated lime HL is transported through the second stage housing 84 from the inlet 108 to the outlet 136. During transport of the hydrated lime HL through the second stage housing 84 the hydrated lime HL is cured to produce cured hydrated lime CR. As defined herein, cured hydrated lime CR is fully hydrated lime of approximately 97 percent or greater hydration, or more approximately 99 percent or greater hydration. In the production of cured hydrated lime CR, temperature control is important for efficient production and for controlling the quality of the cured hydrated lime CR produced. For this purpose, temperature sensors 138 are included at various locations throughout the interior area 130 with sensor data electronically received and used by control device 118 to calculate or determine from programmed, previously stored or entered data, adjustment requirements necessary to affect the water W (if any) feed rate via control valve 91, and rotating paddle set 132 rotation rate for temperature control based thereon. Optionally, the second stage housing 84 may be equipped with a cooling jacket 140 as a source of temperature control. As such, optional cooling jacket 140 at least partially surrounds the second stage housing 84 with a supply of coolant C, such as for example cooled water, circulated therethrough from coolant supply 41 via fluidly connected pipe 43 equipped with control valve 93 mechanically adjustable by electronic control via control device 118.

Using the subject integrated lime hydrator 20, water W supply, rotating paddle set rotation rates, positioning of adjustable control weir 105, and housing 80,84 temperatures may be adjusted depending on varying hydrated lime HL quality requirements and cured hydrated lime CR in situ production requirements for use in DFGD system 18 vertical reactor 26. Cured hydrated lime CR is transported through outlet 136 of the second stage housing 84 and into inlet 142 of distribution device 28.

A method of using the subject integrated lime hydrator 20 comprises supplying quicklime QL from the quicklime silo 44 via duct 44A and fluidly connected quicklime feeder 46 via duct 46A to the quicklime conveyor 82, supplying quicklime QL from the quicklime conveyor 82 through a supply bottom outlet 92 into an inlet 96 of the first stage housing 80, hydrating the quicklime QL with water W from water supply 40 via fluidly connected pipe 42 equipped with control valves 91 electronically controlled by control device 118 in first stage housing 80 to produce hydrated lime HL, controlling residence time of the hydrated lime HL in the first stage housing with positioning of the adjustable control weir 105, supplying hydrated lime HL from first stage housing 80 past the adjustable control weir 105 at bottom outlet 106 to second stage housing 84 for curing of the hydrated lime HL to produce cured hydrated lime CR, supplying the cured hydrated lime CR from second stage housing to a DFGD system 18 distribution device 28 optionally with or without separated solid material SM from fabric filter 22 via duct 60 to produce moistened hydrated lime MR for distribution device 28 dispersal of moistened hydrate lime MR in vertical reactor 26, contacting flue gas FG flowing through vertical reactor 26 with dispersed moistened hydrated lime MR for reaction with flue gas FG acid gas for acid gas reduction producing a dry reaction product DR entrained by the flue gas FG, separating solid particulates and the dry reaction product DR from the flue gas FG in a particulate collector 22 for collection of separated solid materials SM to produce cleaned flue gas CG, and releasing the cleaned flue gas CG to the environment via stack 24.

Installing the subject integrated hydrator 20 according to the embodiment illustrated in FIGS. 2 and 3 into the vertical reactor 26 DFGD system 18 comprises arranging an elongated second stage housing 84 in parallel with the DFGD system 18 distribution device 28 elongated container 53, connecting the outlet 136 of the elongated second stage housing 84 with an inlet 142 of the elongated container 53 for a flow of cured hydrated lime CR from the outlet 136 of the elongated second stage housing 84 into the elongated container 53, arranging the elongated first stage housing 80 at a 0 degree to a 180 degree angle, but perpendicular with respect to the arrangement of the elongated second stage housing 84, connecting the elongated first stage housing 80 bottom outlet 106 at adjustable control weir 105 with an inlet 108 of the second stage housing 84 for a flow of hydrated lime HL past the adjustable control weir 105 at bottom outlet 106 of the first stage housing 80 into the inlet 108 of the second stage housing 84, arranging a quicklime conveyor 82 extending from a quicklime feeder 46 duct 46A to a supply bottom outlet 92, arranging the supply bottom outlet 92 at an inlet 96 of the first stage housing 80, and connecting the supply bottom outlet 92 with the inlet 96 of the first stage housing 80 for a flow of quicklime QL into the first stage housing 80 of the subject integrated lime hydrator 20.

Installing the subject integrated lime hydrator 20 according to the embodiment illustrated in FIG. 4 into the vertical reactor 26 of DFGD system 18 comprises arranging an elongated second stage housing 84 for fluid connection with the distribution device 28 elongated container 53, connecting the outlet 136 of the second stage housing 84 with an inlet 142 of the elongated container 53 for a flow of cured hydrated lime CR from the outlet 136 of the elongated second stage housing 84 into the elongated container 53, arranging the elongated first stage housing 80 in alignment with the elongated second stage housing 84, fluidly connecting the elongated first stage housing 80 bottom outlet 106 at adjustable control weir 105 with an inlet 108 of the second stage housing 84 for a flow of hydrated lime HL past the adjustable control weir 105 at bottom outlet 106 of the first stage housing 80 into the inlet 108 of the second stage housing 84, arranging a quicklime conveyor 82 extending from a quicklime feeder 46 duct 46A to a supply bottom outlet 92, arranging the supply bottom outlet 92 at an inlet 96 of the first stage housing 80, and connecting the supply bottom outlet 92 with the inlet 96 of the first stage housing 80 for a flow of quicklime QL into the first stage housing 80 of the integrated lime hydrator 20.

Maintenance of the subject integrated lime hydrator 20 illustrated in FIGS. 2 and 3 installed into a vertical reactor 26 DFGD system 18 comprises disconnecting the elongated first stage housing 80 bottom outlet 106 at adjustable control weir 105 from an inlet 108 of the second stage housing 84, disconnecting the supply bottom outlet 92 of the quicklime conveyor 82 from the inlet 96 of the first stage housing 80, opening up second stage flat top 126, and opening up first stage flat top 102, for maintaining the elongated second stage housing 84 and/or the elongated first stage housing 80, and/or the associated quicklime conveyor 82.

Maintenance of the subject integrated hydrator 20 illustrated in FIG. 4 installed into a vertical reactor 26 DFGD system 11 comprises disconnecting the elongated first stage housing 80 bottom outlet 106 at adjustable control weir 105 from an inlet 108 of the second stage housing 84, disconnecting the supply bottom outlet 92 of the quicklime conveyor 82 from the inlet 96 of the first stage housing 80, opening up second stage flat top 126, and opening up first stage flat top 102, for maintaining the elongated second stage housing 84 and/or the elongated first stage housing 80, and/or the associated quicklime conveyor 82.

Figure 5:
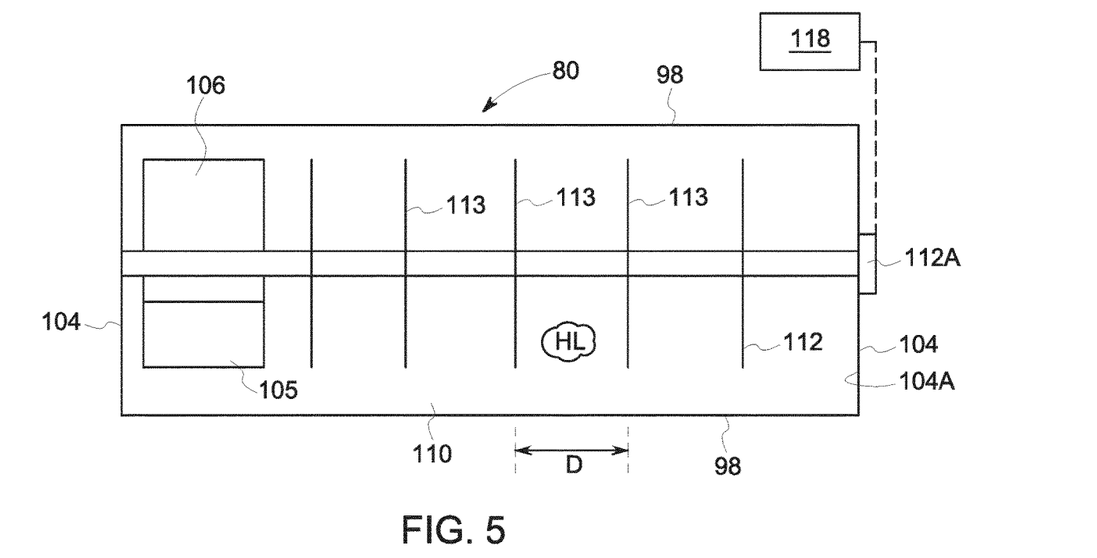
FIG. 5 is an enlarged schematic top cross sectional view of a first stage housing of the subject integrated lime hydrator of FIG. 1 with an adjustable control weir positioned to obscure or cover about 35 percent of a bottom outlet.

Referring now to FIG. 5, a first stage housing 80 of the subject integrated lime hydrator 20 of FIG. 1 is schematically illustrated. As so illustrated, the rotating paddle set 112 is powered by a motor 112A electronically controlled by control device 118. The rotating paddle set 112 is equipped with a plurality of paddles 113 for mixing the quicklime/hydrated lime and for transporting the quicklime/hydrated lime toward elongated first stage housing 80 bottom outlet 106. The plurality of paddles 113 are arranged in a spaced apart orientation with a distance D between adjacent paddles 113. Rotating paddle set 112 also has an adjustable rotation rate electronically controlled by control device 118. At elongated first stage housing 80 bottom outlet 106 is an adjustable control weir 105. As illustrated, adjustable control weir 105 is positioned obscuring or covering about 35 percent of bottom outlet 106. Positioning of adjustable control weir 105 may range from covering about 0 percent of bottom outlet 106 to covering about 100 percent of bottom outlet 106. Adjustable control weir 105 may be adjusted in position with regard to coverage of bottom outlet 106 for control of hydrated lime HL residence time within first stage housing 80 and for control of temperature within first stage housing 80. As such, adjustable control weir 105 is electrically actuated by control device 118 via actuation of actuator 290, illustrated in FIG. 8. When temperature measurements from temperature sensors 116 are relatively the same as data previously programmed, stored or entered into control device 118, the control device 118 may make no electronically controlled mechanical adjustments to affect the adjustable control weir 105 coverage of bottom outlet 106. If temperature measurements from temperature sensors 116 are lower than data programmed, previously stored or entered into control device 118, the control device 118 may electronically control mechanical adjustments to affect an increase in the adjustable control weir 105 coverage of bottom outlet 106 to increase hydrated lime HL residence time within the first stage housing 80 for increased hydration thereof. If temperature measurements from temperature sensors 116 are higher than data programmed, previously stored or entered into control device 118, the control device 118 may electronically control mechanical adjustments to affect a decrease in the adjustable control weir 105 coverage of bottom outlet 106 to decrease hydrated lime HL residence time within the first stage housing 80 for decreased hydration thereof.

Figure 6:
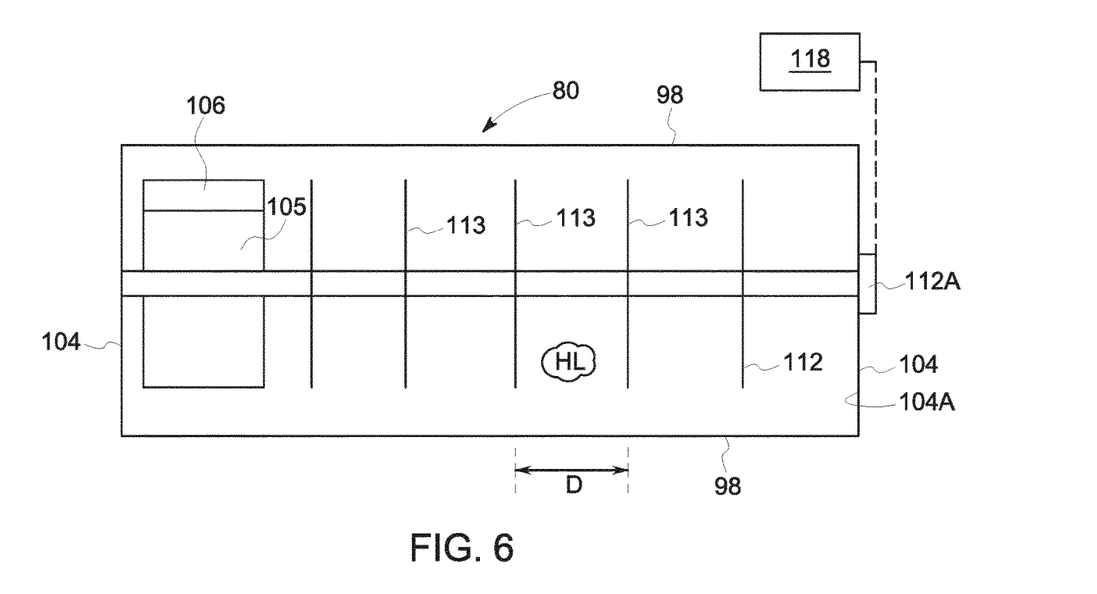
FIG. 6 is an enlarged schematic top cross sectional view of a first stage housing of the subject integrated lime hydrator of FIG. 1 with an adjustable control weir positioned to obscure or cover about 80 percent of a bottom outlet.

Referring now to FIG. 6, a first stage housing 80 of the subject integrated lime hydrator 20 of FIG. 1 is schematically illustrated. As so illustrated, the rotating paddle set 112 is powered by a motor 112a electronically controlled by control device 118. The rotating paddle set 112 is equipped with a plurality of paddles 113 for mixing the quicklime/hydrated lime and for transporting the quicklime/hydrated lime toward elongated first stage housing 80 bottom outlet 106. The plurality of paddles 113 are arranged in a spaced apart orientation with a distance D between adjacent paddles 113. Rotating paddle set 112 also has an adjustable rotation rate controlled by control device 118. At elongated first stage housing 80 bottom outlet 106 is an adjustable control weir 105. As illustrated, adjustable control weir 105 is positioned covering about 80 percent of bottom outlet 106. Positioning of adjustable control weir 105 may range from covering about 0 percent of bottom outlet 106 to covering about 100 percent of bottom outlet 106. Adjustable control weir 105 may be adjusted with regard to coverage of bottom outlet 106 for control of hydrated lime HL residence time within first stage housing 80 and for control of temperature within first stage housing 80. As such, adjustable control weir 105 is electronically actuated by control device 118 via actuation of actuator 290, illustrated in FIG. 8. When temperature measurements from temperature sensors 116 are relatively the same as data previously programmed, stored or entered into control device 118, the control device 118 may make no electronically controlled mechanical adjustments to affect the adjustable control weir 105 coverage of bottom outlet 106. If temperature measurements from temperature sensors 116 are lower than data programmed, previously stored or entered into control device 118, the control device 118 may electronically control mechanical adjustments to affect an increase in the adjustable control weir 105 coverage of bottom outlet 106 to increase hydrated lime HL residence time within the first stage housing 80 for increased hydration thereof. If temperature measurements from temperature sensors 116 are higher than data programmed, previously stored or entered into control device 118, the control device 118 may electronically control mechanical adjustments to affect a decrease in the adjustable control weir 105 coverage of bottom outlet 106 to decrease hydrated lime HL residence time within the first stage housing 80 for decreased hydration thereof.

Figure 7:
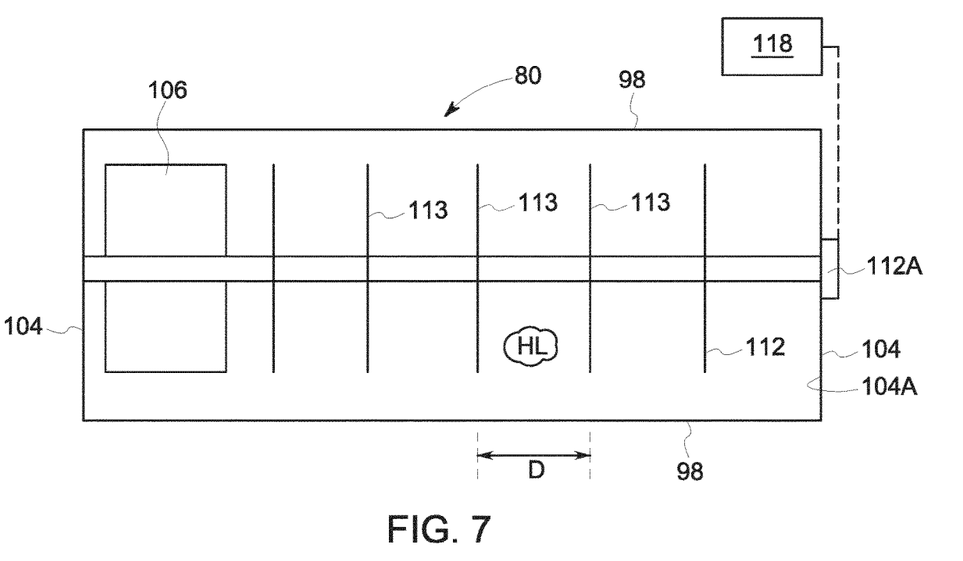
FIG. 7 is an enlarged schematic top cross sectional view of a first stage housing of the subject integrated lime hydrator of FIG. 1 with an adjustable control weir positioned to obscure or cover about 0 percent of a bottom outlet.

Referring now to FIG. 7, a first stage housing 80 of the subject integrated lime hydrator 20 of FIG. 1 is schematically illustrated. As so illustrated, the rotating paddle set 112 is powered by a motor 112a electronically controlled by control device 118. The rotating paddle set 112 is equipped with a plurality of paddles 113 for mixing the quicklime/hydrated lime and for transporting the quicklime/hydrated lime toward elongated first stage housing 80 bottom outlet 106. The plurality of paddles 113 are arranged in a spaced apart orientation with a distance D between adjacent paddles 113. Rotating paddle set 112 also has an adjustable rotation rate controlled by control device 118. At elongated first stage housing 80 bottom outlet 106 is an adjustable control weir 105. As illustrated, adjustable control weir 105 (obscured in top view illustration) is positioned covering about 0 percent of bottom outlet 106. Positioning of adjustable control weir 105 may range from covering about 0 percent of bottom outlet 106 to covering about 100 percent of bottom outlet 106. Adjustable control weir 105 may be adjusted with regard to coverage of bottom outlet 106 for control of hydrated lime HL residence time within first stage housing 80 and for control of temperature within first stage housing 80. As such, adjustable control weir 105 is electronically actuated by control device 118 via actuation of actuator 290, illustrated in FIG. 8. When temperature measurements from temperature sensors 116 are relatively the same as data previously programmed, stored or entered into control device 118, the control device 118 may make no electronically controlled mechanical adjustments to affect the adjustable control weir 105 coverage of bottom outlet 106. If temperature measurements from temperature sensors 116 are lower than data programmed, previously stored or entered into control device 118, the control device 118 may electronically control mechanical adjustments to affect an increase in the adjustable control weir 105 coverage of bottom outlet 106 to increase lime QL residence time within the first stage housing 80 for increased hydration thereof. If temperature measurements from temperature sensors 116 are higher than data programmed, previously stored or entered into control device 118, the control device 118 may electronically control mechanical adjustments to affect a reduction in temperature, such as for example by increasing the circulation rate of coolant C through cooling jacket 120 via control valve 93, since a further decrease in the adjustable control weir 105 coverage of bottom outlet 106 to decrease lime QL residence time within the first stage housing 80 for decreased hydration thereof is not possible.

Figure 8:
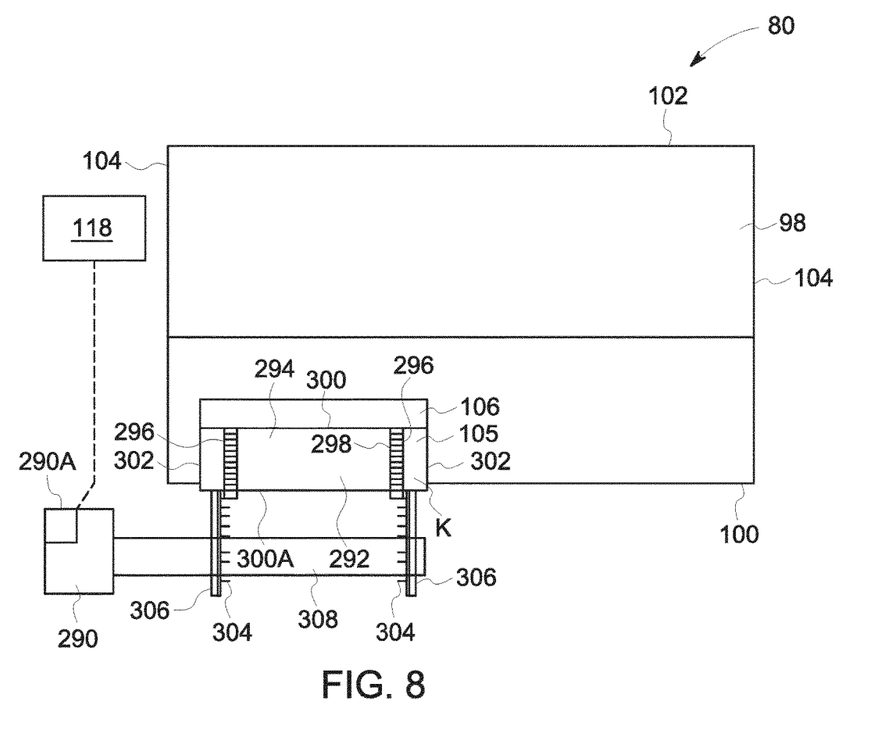
FIG. 8 is an enlarged schematic side cross sectional view of a first stage housing of the subject integrated lime hydrator of FIG. 1 with an electrically actuated adjustable control weir.

Illustrated in FIG. 8 is an enlarged schematic side cross sectional view of a first stage housing 80 of the subject integrated lime hydrator 20 of FIG. 1 with an electrically actuated adjustable control weir 105. Adjustable control weir 105 is formed as a curved panel 292 of a like degree of curvature K to that of first stage housing 80 rounded elongated bottom 100. On exterior surface 294 of curved panel 292 is at least one row 296 of a plurality of outwardly extended gear teeth 298. At least one row 296 extends at least partially from top end 300 to bottom end 300A, parallel with and between opposed side walls 302, on exterior surface 294 of curved panel 292. Extended gear teeth 298 engage with a plurality of spikes 304 extending from one or more spiked wheels 306 arranged on rotating axil 308. Rotating axil 308 is rotated by an actuator 290 with a motor 290A. Operation of motor 290A is electronically controlled by control device 118. Upon control device electronic signal to actuator 290, motor 290A operates to rotate rotating axil 308. Upon rotation of rotating axil 308, the plurality of spikes 304 extending from the one or more spiked wheels 306 engage extended gear teeth 298 thereby moving adjustable control weir 105 either forward for adjustable control weir 105 partial to complete coverage of bottom outlet 106, or backward for adjustable control weir 105 partial to complete exposure of bottom outlet 106, depending upon degree of rotation of rotating axil 308. The plurality of spikes 304 extending from the one or more spiked wheels 306 engaging extended gear teeth 298 to move adjustable control weir 105 is provided as a preferred embodiment. Other systems for moving adjustable control weir 105 are also possible, such as for example pneumatic movement, or the like.

The subject systems and methods may be further summarized as a plant 10 comprising an integrated lime hydrator 20 comprising at least one first stage housing 80 equipped with an adjustable control weir 105, a water supply 40, a paddle set 112 and a quicklime supply 44, operative to produce hydrated lime HL. The subject integrated lime hydrator 20 further comprises a second stage housing 84 equipped with a water supply 40, a paddle set 132 and a hydrated lime HL supply from the first stage housing 80 operative to produce cured hydrated lime CR, wherein the integrated lime hydrator 20 is integrated with a distribution device 28 equipped with a water supply 40 and a cured hydrated lime CR supply from the second stage housing 84 with or without a supply of separated solid material SM from fabric filter 22 via duct 60, the distribution device 28 operative to produce moistened hydrated lime MR and to distribute the moistened hydrated lime MR, and a reactor 26 equipped with a flow of flue gas FG and a moistened hydrated lime MR supply from the distribution device 28 operative for moistened hydrated lime MR distribution within the flow of flue gas FG for a reduction in flue gas acid gas to produce cleaned flue gas CG. As such, the quicklime QL is supplied via a conveyor 82 from a quicklime silo 44 duct 44A via a feeder 46 duct 46A. Additionally, the first stage housing 80 is equipped with a cooling jacket 120 operative for temperature control, and is operated at a temperature in the range of about 50 degrees Celsius to about 200 degrees Celsius, or about 150 degrees Celsius. The water supply 40, quicklime QL supply via conveyor 82, adjustable control weir 105, and temperature of the first stage housing 80 are each controlled by a control device 118.

Further, the plant further comprises temperature sensors 116, 138 for temperature control controlled by a control device 118. The subject integrated lime hydrator 20 of the plant 10 further comprises a second stage housing 84 operated at a temperature in the range of about 50 degrees Celsius to about 200 degrees Celsius, or about 150 degrees Celsius. A method of using this lime hydrator 20 integrated in a plant 10 comprises producing in at least one first stage housing 80 equipped with an adjustable control weir 105, a water supply 40, and a quicklime QL supply via conveyor 82, hydrated lime HL, and producing in a second stage housing 84 equipped with a hydrated lime HL supply from the at least one first stage housing 80, cured hydrated lime CR in-situ. The method further comprises producing in a distribution device 28 equipped with a water supply 40, a cured hydrated lime CR supply from the second stage housing 84, and optionally a supply of separated solid material SM from fabric filter 22 via duct 60, moistened hydrated lime MR, and reacting in a vertical reactor 26 equipped with a flow of flue gas FG and moistened hydrated lime MR supplied from the distribution device 28, the moistened hydrate lime MR with the flow of flue gas FG for flue gas acid gas reduction to produce cleaned flue gas CG. The method further comprises equipping the first stage housing 80 with a cooling jacket 120 operative for temperature control. The method further comprises operating the first stage housing 80 at a temperature in the range of about 50 degrees Celsius to about 200 degrees Celsius, or about 150 degrees Celsius. The method further comprises operating the second stage housing 84 at a temperature in the range of about 50 degrees Celsius to about 200 degrees Celsius, or about 150 degrees Celsius. The method further comprises controlling the water supply 40, the quicklime QL supply via conveyor 82, the adjustable control weir 105, a temperature of the first stage housing 80, and a temperature of the second stage housing 84 using a control device 118.

While this invention has been described with reference to various exemplifying embodiments, it will be understood by those skilled in the art that various changes can be made and equivalents can be substituted for features thereof without departing from the scope of the disclosure. In addition, many modifications can be made to adapt a particular situation or material to the teachings of the disclosure without departing from the essential scope thereof. Therefore, it is intended that the disclosure not be limited to the particular exemplified embodiments disclosed herein as the best mode contemplated, but that the disclosure will include all embodiments falling within the scope of the appended claims.

The invention claimed is:

1. A method of using an integrated lime hydrator in a plant, comprising:
   producing hydrated lime in at least one first stage housing having a bottom outlet and equipped with an adjustable control weir operable to cover any portion of the bottom outlet, a water supply, and a quicklime supply; and
   producing cured hydrated lime in-situ in a second stage housing equipped with a hydrated lime supply from the at least one first stage housing via the bottom outlet.

2. The method of claim 1, further comprising
   producing moistened hydrated lime in a distribution device equipped with a water supply and a cured hydrated lime supply from the second stage housing; and
   reacting in a vertical reactor equipped with a flow of flue gas and the moistened hydrated lime supplied from the distribution device, the moistened hydrated lime with the flow of flue gas for flue gas acid gas reduction to produce cleaned flue gas.

3. The method of claim 1, further comprising equipping the first stage housing with a cooling jacket operative for temperature control.

4. The method of claim 1, further comprising operating the first stage housing at a temperature in the range of about 50 degrees Celsius to about 200 degrees Celsius.

5. The method of claim 1, further comprising operating the second stage housing at a temperature in the range of about 50 degrees Celsius to about 200 degrees Celsius.

6. The method of claim 1, further comprising controlling the water supply, the quicklime supply, the adjustable control weir, a temperature of the first stage housing, and a temperature of the second stage housing using a control device.

* * * * *